(12) United States Patent  
Anderson et al.

(10) Patent No.: US 8,001,101 B2
(45) Date of Patent: Aug. 16, 2011

(54) PRESENTING INSTANT ANSWERS TO INTERNET QUERIES

(75) Inventors: Christopher W. Anderson, Redmond, WA (US); Edward David Harris, Bellevue, WA (US); Ravi Aringunram, Sammamish, WA (US); Paul Miller, Redmond, WA (US); Ajay Nair, Redmond, MO (US); Vishal Singh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 12/144,326

(22) Filed: Jun. 23, 2008

(65) Prior Publication Data

US 2009/0319495 A1    Dec. 24, 2009

(51) Int. Cl.
*G06F 17/30* (2006.01)
(52) U.S. Cl. ......... 707/706; 707/702; 707/723; 707/767
(58) Field of Classification Search .................. 707/706, 707/723, 763, 767, 702
See application file for complete search history.

(56) References Cited

U.S. PATENT DOCUMENTS

| | | | | |
|---|---|---|---|---|
| 7,231,375 | B2 * | 6/2007 | Ratnaparkhi et al. | ............ 706/12 |
| 7,844,599 | B2 * | 11/2010 | Kasperski et al. | ............ 707/713 |
| 2001/0049688 | A1 | 12/2001 | Fratkina | |
| 2002/0194197 | A1 | 12/2002 | Flank | |
| 2003/0028498 | A1 | 2/2003 | Hayes-Roth | |
| 2006/0106788 | A1 | 5/2006 | Forrest | |
| 2006/0286530 | A1 | 12/2006 | Forrest | |
| 2007/0156660 | A1 | 7/2007 | Moricz | |
| 2007/0219863 | A1 * | 9/2007 | Park et al. | ........................ 705/14 |
| 2008/0016034 | A1 * | 1/2008 | Guha et al. | ........................ 707/3 |
| 2008/0250008 | A1 * | 10/2008 | Gollapudi et al. | ................ 707/5 |
| 2008/0306934 | A1 * | 12/2008 | Craswell et al. | ................ 707/5 |

FOREIGN PATENT DOCUMENTS

| | | |
|---|---|---|
| EP | 0915422 A1 | 5/1999 |
| WO | 0077691 A1 | 12/2000 |
| WO | 2007035912 A2 | 3/2007 |
| WO | 2007094596 A2 | 8/2007 |

OTHER PUBLICATIONS

Metze et al., A Community-based Expert Finding System, http://www.tansu.alpcan.org/papers/spree-icsc2007-final1.pdf, ?Sep. 2007.
Yahoo! Answers, http://answers.yahoo.com/info/welcome;_ylt=Ap89aNqyHGXd4TTGi2J1RB3py6IX;_ylv=3, Feb. 28, 2008.
Google Answers: Frequently Asked Questions, http://answers.google.com/answers/faq.html, Feb. 28, 2008.

* cited by examiner

*Primary Examiner* — Cheryl Lewis
(74) *Attorney, Agent, or Firm* — Shook Hardy & Bacon LLP (57) ABSTRACT

Methods are described for utilizing user-submitted data to provide a response to a query request. User-submitted data are received and referenced upon receiving a query request from an unregistered requester, a potential response is automatically identified from the user-submitted data, the potential response is extracted, and presented in response to the query request.

18 Claims, 8 Drawing Sheets

PRESENTING INSTANT ANSWERS TO INTERNET QUERIES

SUMMARY

This summary is provided to introduce a selection of concepts in a simplified form that are further described below in the detailed-description section. This summary is not intended to identify key features or essential features of the claimed subject matter, nor is it intended to be used as an aid in determining the scope of the claimed subject matter. The invention is defined by the claims below. But summarily, one embodiment of the present invention provides for receiving user-submitted data that includes information to be utilized when providing a response to a search query.

In a first aspect, a set of computer-useable instructions provide a method of providing a response to a query request. The method includes receiving the query request by way of an internet search engine, the query request including a set of query terms. A set of user-submitted data that include information to be used to provide a potential response to a given query are automatically referenced. The user-submitted data is being provided by entities interested in providing potential responses to certain search terms. The data files include trigger phrases and corresponding suggested responses that correspond to the trigger phrases. The method includes identifying one or more of the user-submitted data that include prescribed trigger phrases that are relevant to the query terms. The method additionally includes referencing a set of suggested responses that correspond to the prescribed trigger phrases. Based on the set of suggested responses, selecting a response from the set of suggested responses, thereby providing a selected response. The method additionally includes providing for a presentation of a the selected response.

In a second aspect, a method provides for receiving a user-submitted potential response to an internet query request. The method includes receiving user-submitted data that
includes one or more of the user-submitted potential responses. The user-submitted data include the following modules: a data module that includes information to be used to provide a potential response to a given search query, a feed-mapping module that provides a translation for the information of the data module to be interpreted regardless of the formatting of the information, a display-mapping module that provides a preferred presentation style for the potential response, and a query-matching module that includes at least one trigger phrase associated with the potential response, such that the trigger phrase initiates the potential response. The method includes verifying the modules conform to predefined valid formats. After verifying the modules, the method includes packaging the user-submitted data as a condensed data file. The method additionally includes communicating the condensed data file to a search-query server, such that the internet query received by the query server triggers the user-submitted potential response to be presented in response to the internet search query.

In a third aspect, a set of computer-useable instructions that provide a method of providing a response to a query request. The method includes receiving the query request that includes query terms from a requester. The requester is not registered to receive the response. The method additionally includes referencing data submitted by a user authorized to submit the data. The data include potential responses to the query request. The data include modules that have been validated as valid modules that are in an extensible markup language format. The modules include a data module that includes information to be used to provide a potential response to a given search query, a feed-mapping module that provides a translation for the information of the data module to be interpreted regardless of the formatting of the information, a display-mapping module that provides a preferred presentation style for the potential response, and a query-matching module that includes at least one trigger phrase associated with the potential response, such that the trigger phrase initiates the potential response. The method includes identifying the potential response based on a pattern match between the query terms and the query matching module. The information of the identified potential response is extracted utilizing the feed mapping module. The method additionally includes presenting the extracted information to the requester such that the extracted information is presented according to the display mapping module.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

Figure 1:
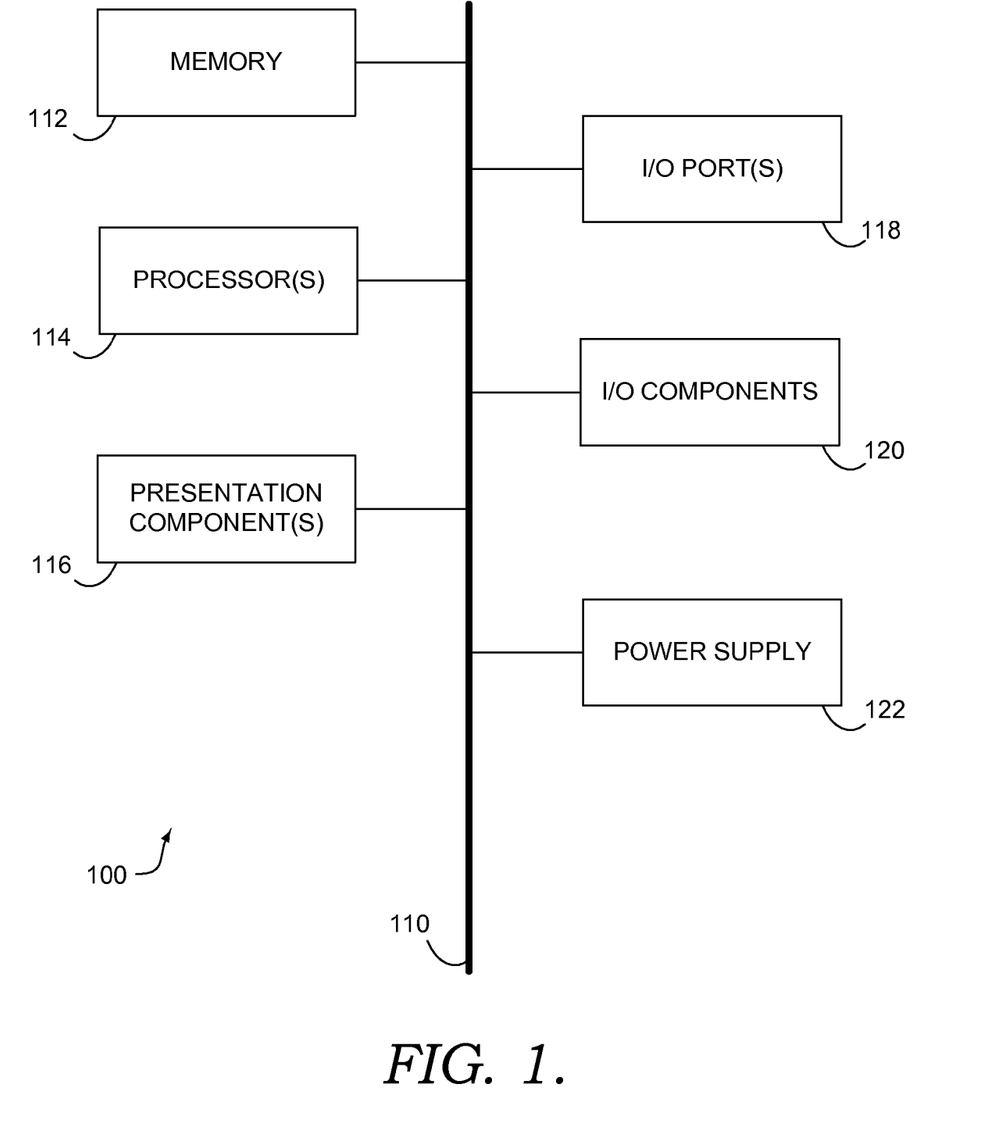
FIG. 1 is a high-level block diagram of a computing device that might be used in connection with various embodiments of the present invention.

Referring to the drawings in general, and initially to FIG. 1 in particular, an illustrative computing device 100 is presented. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated. Computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media include both volatile and nonvolatile media, removable and nonremovable media, and contemplates media readable by a database, a switch, and various other network devices. Examples of stored information include computer-useable instructions, data structures, program modules, and other data representations. Media examples include, but are not limited to Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
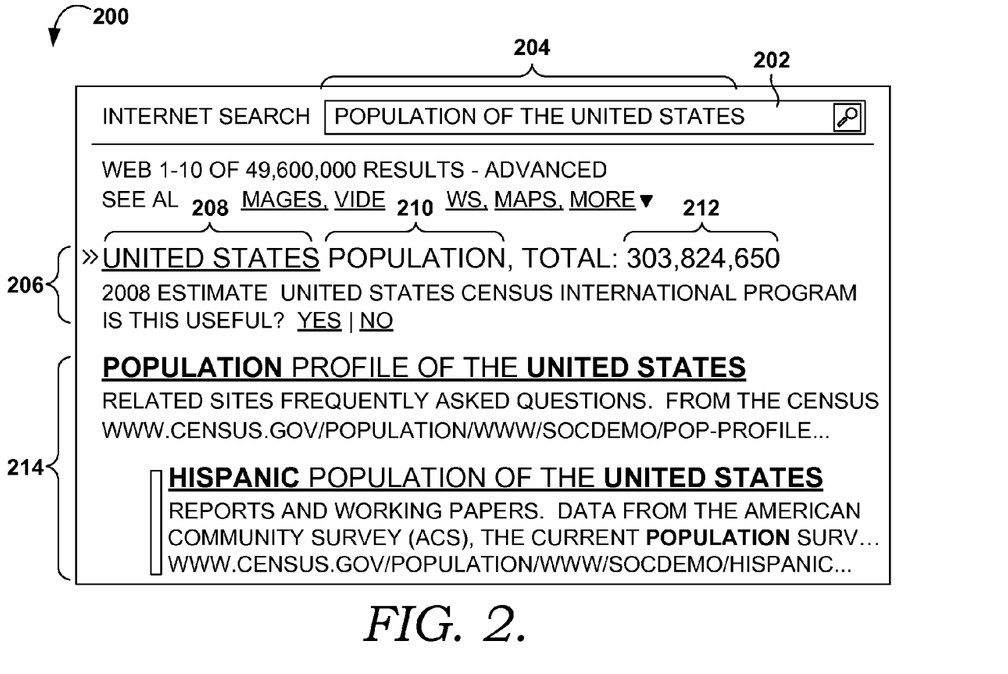
FIG. 2 is a screenshot of an illustrative presentation of an instant answer according to an embodiment of the present invention.

FIG. 2 is an illustrative screenshot depicting an embodiment of information presented via presentation module 116 and referenced generally by the numeral 200. Screenshot 200 depicts a presentation of an answer based on user-submitted data (hereafter referred to as user-submitted response 206) that is presented in response to a search query 204 entered in a search query field 202. The user-submitted response 206 is also referred to as user-submitted potential response, a response, and extracted information. User-submitted response 206 is depicted above the standard search query results 214. In an exemplary embodiment, the user-submitted response 206 provides an answer to the search query 204 without requiring the requester to navigate away from the search query results to obtain an answer to the search query. Screenshot 200 depicts the presentation of the user-submitted response 206 that provides an answer to search query 204 that relates to a question regarding the population of the United States.

User-submitted response 206 includes a subject 208, a term 210, and a value 212. In an exemplary embodiment, subject 208 is a category that covers a variety of terms, such as term 210. For each term there is an associated value, such as value 212. Screenshot 200 depicts the presentation of user-submitted response 206, with a subject 208 that depicts "UNITED STATES," a term 210 that depicts "POPULATION," and a value 212 that depicts "303,824,650."

Internet search query requesters may desire an answer (information related) to their search query without being required to navigate through the plurality of internet documents typically returned. Further, the requester may desire to have the answer prominently displayed in conjunction with their traditional internet search results. Moreover, efficiencies can be reaped by providing responses to a search query that provide the desired information without requiring further navigation. In an exemplary embodiment of the present invention, when a requester enters a search query 204 in the search query field 202, the requester is presented with user-submitted response 206. The user-submitted response 206 is presented to the requester at a prominent position relative to the traditional search query results 214. Additionally, the user-submitted response 206 provides an answer that does not require navigation from the query results, as would be required by the traditional query results 214.

Figure 3:
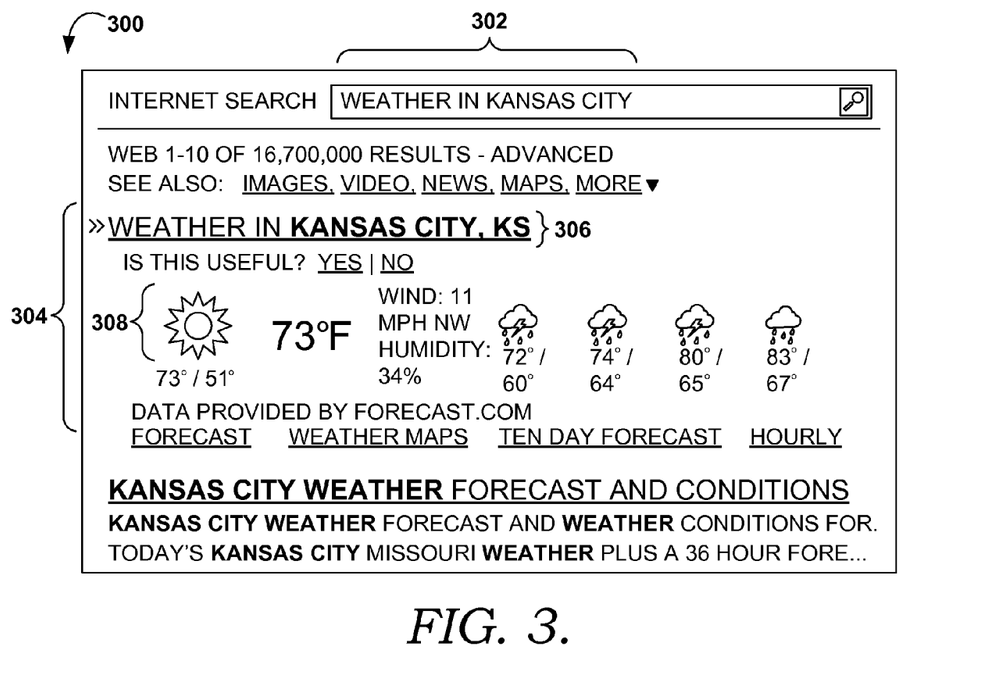
FIG. 3 is another screenshot of an illustrative presentation of an instant answer according to an embodiment of the present invention.

Referring now to FIG. 3, an illustrative screenshot depicting an embodiment of information presented via presentation module 116 and referenced generally by the numeral 300. Screenshot 300 depicts an exemplary embodiment where the user-submitted response 304 (response based on user-submitted data) includes graphical elements, such as graphical element 308. Screenshot 300 depicts an answer 304 that includes graphical element 308 to provide an answer to the search query 302. The search query 302 represents a search query for the weather in Kansas City. In response to the search query 302, screenshot 300 depicts user-submitted response 304 that provides the weather and forecasted weather for Kansas City.

Screenshot 200 and screenshot 300 depict presentations of exemplary embodiments of the present invention and are not intended to be limiting as to the scope of the present invention. Instead, screenshot 200 and screenshot 300 provide a context to describe the invention to facilitate a clearer understanding. Therefore, screenshot 200 and screenshot 300 depict exemplary embodiments and are not limiting as to the scope of the present invention. For example, user-submitted responses may additionally include image content, actionable links, video content, audio content, and text.

Figure 4:
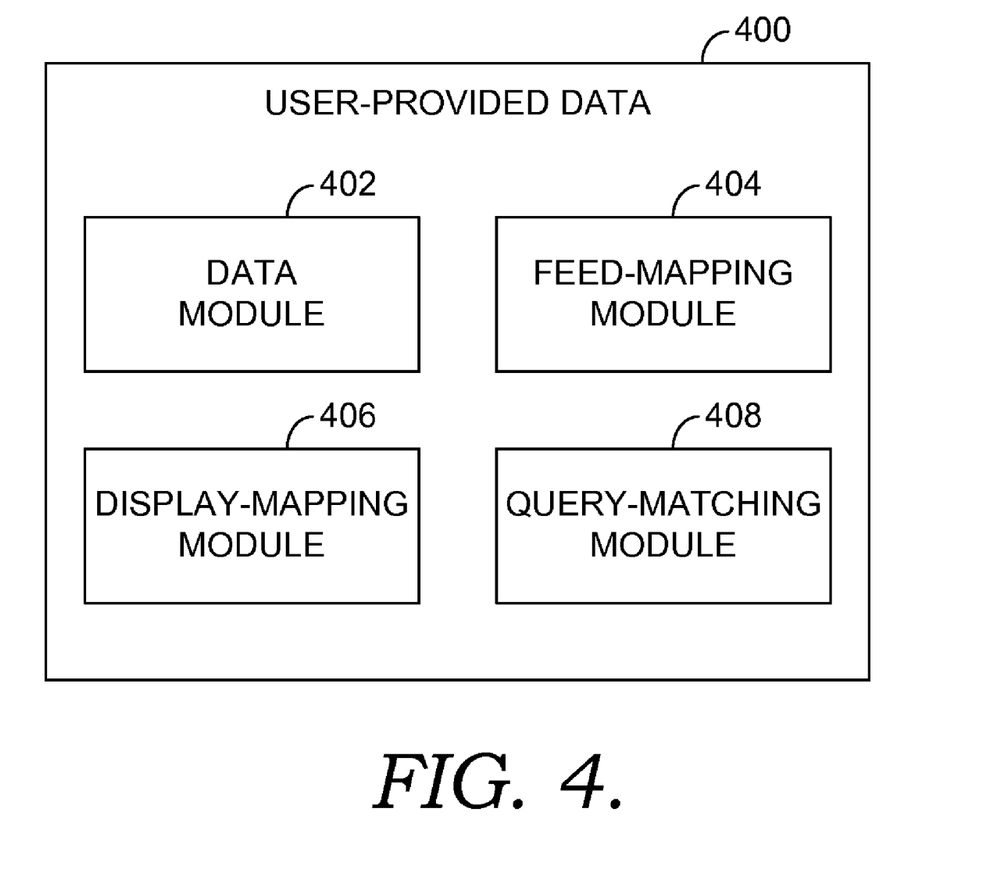
FIG. 4 depicts a graphical illustration of user-submitted data according to an embodiment of the present invention.

Turning now to FIG. 4, which visually depicts user-submitted data 400. User-submitted data 400 are data provided by an entity. The user provides the user-submitted data 400 to be utilized for a user-submitted response, such as user-submitted response 206. User-submitted data 400 include a data module 402, a feed-mapping module 404, a display-mapping module 406, and a query-matching module 408 (collectively referred to as the "modules").

User-submitted data 400 in an exemplary embodiment are provided by an entity that has registered as a user to provide user-submitted data 400. Registration of the entity may include requiring the entity to be identified and approved as to the entity's ability to provide user-submitted data. Registration of the user provides accountability, credibility, and consistency to the user-submitted data 400. In an alternative exemplary embodiment, the entity that provides the user-submitted data 400 is not registered and may be done anonymously. In this embodiment, the entity that submits user-submitted data 400 is not know or associated with the user-submitted data 400.

In an exemplary embodiment, user-submitted data 400 are a single file that includes the information of data module 402, the feed-mapping module 404, the display-mapping module 406, and the query matching-module 408. In an additional exemplary embodiment, user-submitted data 400 include multiple files that are communicated either concurrently, consecutively, or independently of one another. Therefore, while FIG. 4 illustrates user-submitted data 400 as including all four modules, any combination of the modules may comprise user-submitted data 400. Additionally, in an exemplary embodiment, the various modules that comprise user-submitted data 400 are communicated individually without a dependency that the remaining modules are communicated or provided. For example, when data module 402 is communicated by a user, the feed-mapping module 404, the display-mapping module 406, and the query-mapping module 408 are not required to be communicated. This may occur when the user has updated the information included in the data module 402, but not the information included with the remaining modules, and the modules were previously communicated.

The formatting of the information comprising the modules includes, but is not limited to, file formats compatible with XML, CSV, and tab delimitated. For example, the information included in the data module 402 is provided as XML in an exemplary embodiment. But, it is understood and appreciated by those with ordinary skill in the art that any comparable file format that allows for the communication of data in a manner that is adaptable to be communicated, received, and interpreted are contemplated.

Data module 402 includes information that will provide the user-submitted response to a search query. For example, with reference to screenshot 200, the data module 402 includes the subject 208 "United States," the term 210 "Population," and the associated value 212, "303,824,650" that is utilized to provide the user-submitted response 206. In an exemplary embodiment, the information of data module 402 includes one or more subjects, one or more terms associated with a subject, and values associated with the terms. For example, a subject may include "United States," the terms associated with the subject "United States" include "Population," "Area," and "Poultry." Therefore, the broad subject of United States includes the terms Population, Area, and Poultry. Each of the terms has an associated value. The value associated with the subject United States and the term Population is "303,824,650," the value associated with the subject United States and the term Area is "251,517 sq mi," and the value associated with the subject United States and the term Poultry is "2,318,860,000."

Data module 402 is provided by an entity that supplies the information, such as the one or more subjects, one or more terms, and associated values that populate the data modules 402 with the information that will be utilized to provide a user-submitted response. The source of the information that comprises the data module 402 may be derived automatically from a data store, manually from a data store, or through manual entry by the entity. For example, the constantly changing value associated with a subject "Weather" and a term "Kansas City" may be automatically retrieved from a data store in order to populate the data module 402.

Feed-mapping module 404 serves as an adapter that allows the information of the data module 402 to be interpreted and utilized. The adaptation of the information contained in the data module 402 into a structure that can be interpreted and utilized is accomplished through a mapping function. The mapping function maps the elements of the data module information to known predefined elements that can be utilized. This allows the structure of the data module 402 to be in any format independent of structure requirements established to interpret the information of the data module 402. As a result, flexibility in the structure of the information is obtained. For example, the feed-mapping module 404 allows raw information from an entity to be provided as a data module 402, where the structure of the raw information does not have to be altered to be communicated as part of the data module 402. Instead, the raw information included in the data module 402 is interpreted and utilized as a result of the adaptation ability created by the feed-mapping module 404. Raw data are data that generally has not been formatted for purposes other than the purpose for which it was generated.

For example, in an exemplary embodiment the data module 402 is in a format that is derived from the underlying store from which the information was automatically created. In order for the information contained in the data module 402 to be utilized for providing a user-submitted response, the feed-mapping module is generated that maps the subjects, terms and values of the information to known structural elements. Therefore, the raw information that forms the information of data module 402, can be interpreted based on the mapping that is included in the feed-mapping module. This mapping serves as an adapter between the structure of the submitted information and a structure that can be anticipated. Ultimately, this provides flexibility and reduces the rigidity of the user-submitted data.

The display-mapping module 406 maps the elements included in the information of the data module 402 to element locations on a user interface. The mapping of information elements to element locations allows the entity submitting the user-submitted data to control the way the user-submitted response is presented.

For example, in an exemplary embodiment, the display-mapping module 406 maps the presentation of a user-submitted response to be displayed with the subject on the first line, the term following the subject on the same presentation line, followed by fixed text, and finished with the value. The second presentation line provides the source of the user-submitted response. Continuing with this example, we refer back to FIG. 2, and in particular to user-submitted response 206. The feed-mapping modules 406, in this exemplary embodiment utilizes a display-mapping module as discussed above. The subject 208, "United States" is presented on the first presentation line. The term 210, "Population" is presented second on the first presentation line. There is a portion of fixed text that states ", TOTAL" followed by the value 212, "303,824,650" on the first presentation line. The display-mapping module 406 provides the presentation location for each of these information elements.

One or more display-mapping modules 406 may be included with the user-submitted data 400, depending on the variety of user interfaces to which the user maps the information of the data module 402. In an exemplary embodiment, a different display-mapping module 406 is utilized for each user interface on which the user-submitted response is to be presented. In an alternative exemplary embodiment, a universal feed-mapping module 406 is provided that is utilized as a default adapter for a user-interface for which a specific feed-mapping module 406 has not been created.

Query-matching module 408 provides one or more trigger phrases that allow the information of the data module 402 to be provided as a user-submitted response in response to a search query. The query-matching module 408 is provided to facilitate the matching between a search query and a potential user-submitted response. For example, query-matching module 408 creates an association between a variety of search queries and a particular potential user-submitted response. Referring back the FIG. 2, the user-submitted response 206 provided an answer for the query of the population of the United States. The trigger phrases of query-matching module 408 may be used to create a pattern map that associates queries such as: "US population," "population of the United States," "population of USA," "number of people in the USA," and "United States of America population." The trigger phrases of the query-matching module 408 provide this association so that when a search query is received that matches a pattern map, an associated user-submitted response is identified from the data module 402.

Continuing with the example of the user-submitted response to a search query for the population of the United States. The user-submitted response provided in the above example implicitly utilized the current United State population, but the query-matching module 408 can also map to a user-submitted response for a different time period. For example, the search query may include the terms "United States," "Population," and "1980." The query-matching module will utilize the explicitly included year of "1980" when mapping the search query to a user-submitted response. The selected user-submitted response will therefore reflect the 1980 United States population as opposed to the current United States population. Generally, logic utilizing implicit terms as well as logic utilizing explicit search query terms are contemplated to provide a user-submitted response. Utilization of implicit search query terms allows a user-submitted response to be provided regardless of the level of specificity of the search query. While, the utilization of explicit search terms allows for a higher confidence that the requester of the search query desires the selected user-submitted response.

Figure 5:
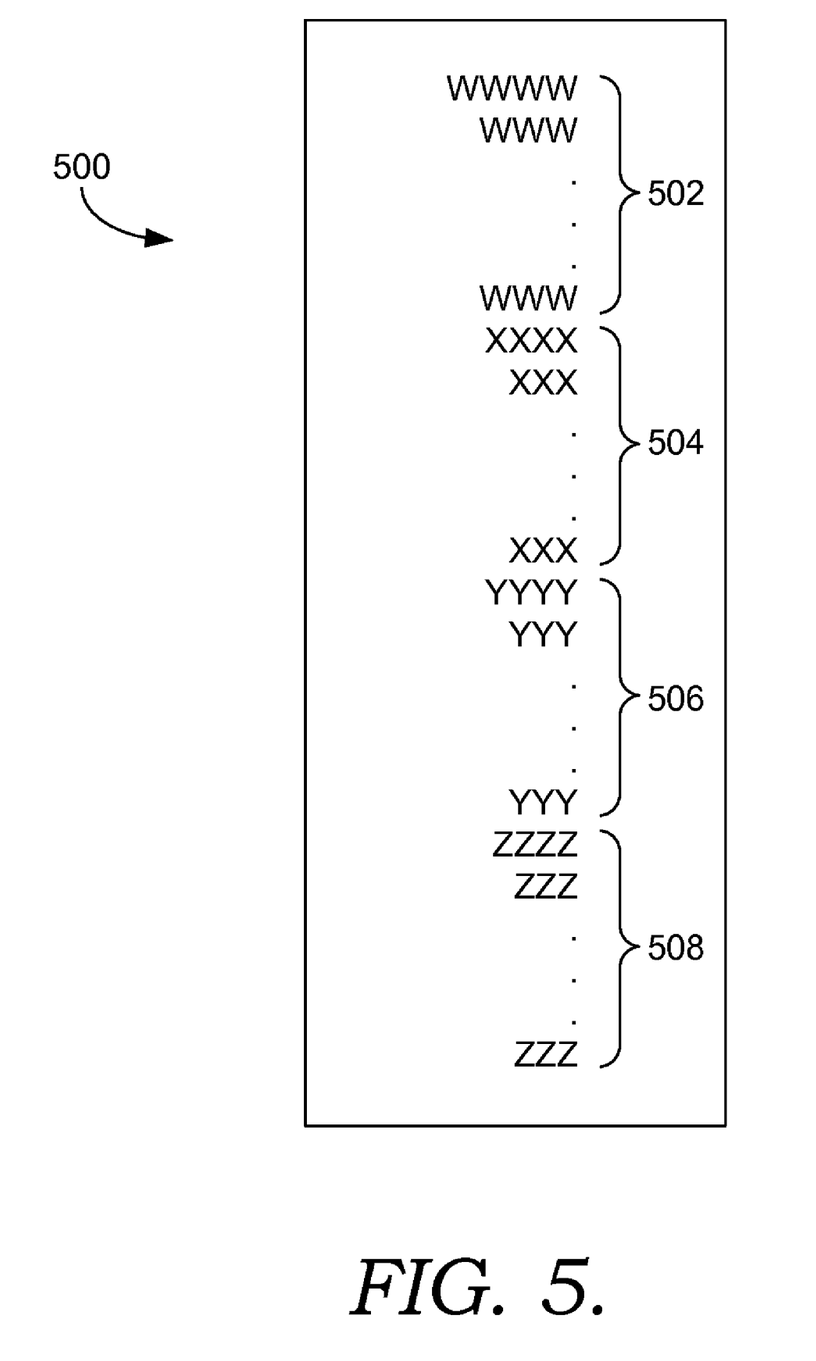
FIG. 5 depicts another graphical illustration of user-submitted data according to an embodiment of the present invention.

Turning now to FIG. 5, a visual depiction of an exemplary embodiment of user-submitted data depicted by numeral 500. User-submitted data 500 are comparable to user-submitted data 400. User-submitted data 500 visually depict a single user-submitted data file that incorporate the information previously discussed with respect to data module 402, the feed-mapping module 404, the display-mapping module 406, and the query-mapping module 408 into a single user-submitted data file. The information previously included with each module individually, is depicted as part of a single user-submitted data file 500. Therefore, the information of data module 402 is represented by numeral 502, the information of the feed-mapping module 404 is represented by numeral 504, the information of display-mapping module 406 is represented by numeral 506, and the information of query-matching module 408 is represented by numeral 508.

Figure 6:
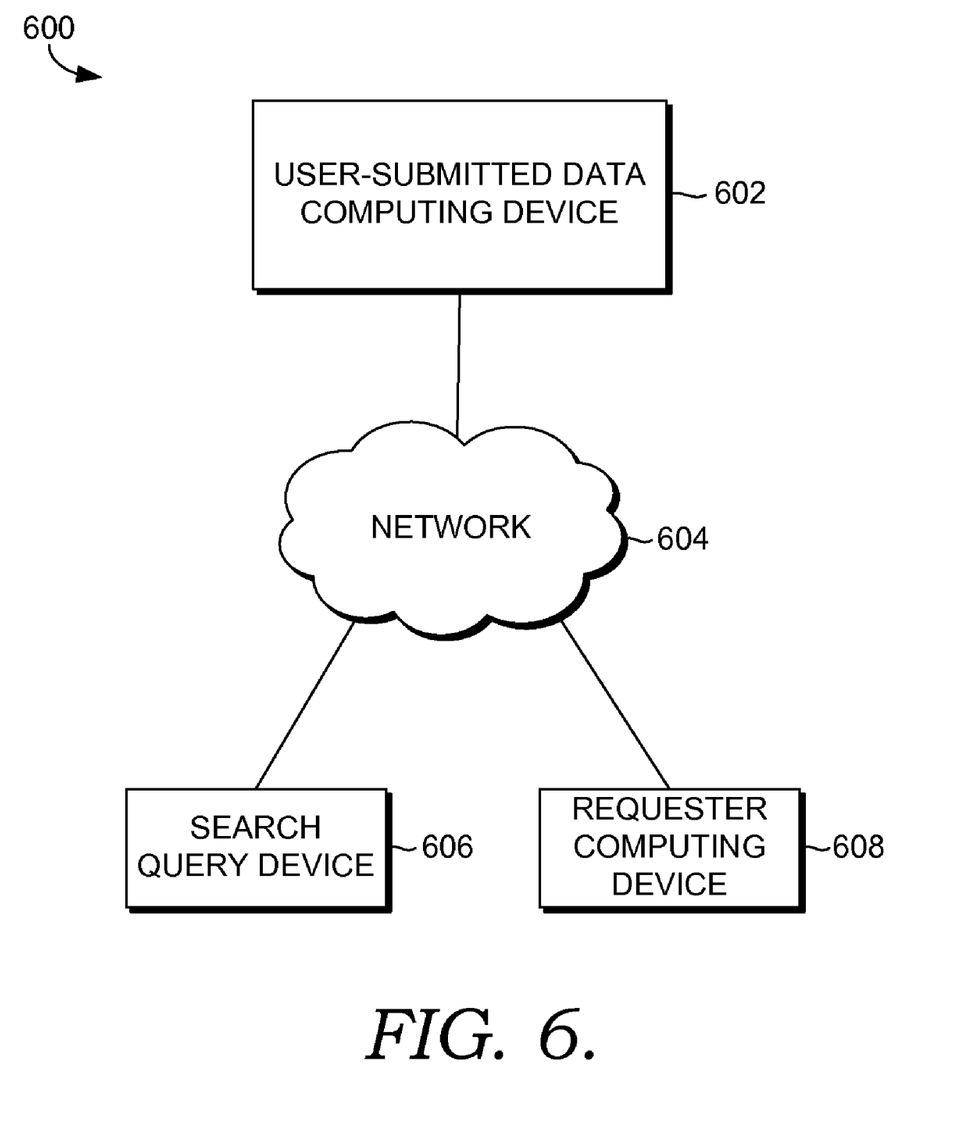
FIG. 6 depicts an illustrative operating environment suitable for implementing an embodiment of the present invention.

Turning now to FIG. 6, an illustrative operating environment suitable for practicing an embodiment of the invention is provided and referenced generally by the numeral 600. A user-submitted data computing device is depicted by numeral 602. A user-submitted data computing device is a computing device that allows an entity to provide user-submitted data. In an exemplary embodiment, user-submitted data computing device 602 is comparable to computing device 100 discussed above with reference to FIG. 1. The user-submitted data computing device 602 is coupled to a network depicted by numeral 604. The network 604 may include, without limitation, one or more local networks, (LANs) and/or wide area networks (WANs). Such networking environments are commonplace in offices, enterprise-wide computer networks, intranets, and the internet. Accordingly, the network 604 is not further described herein.

A search query device is depicted by numeral 606. The search query device is coupled to network 604. In an exemplary embodiment, search query device 606 is generally one or more computing devices operated by a search query operator. In an exemplary embodiment, search query device 606 is comparable to computing device 100. Search query device 606 allows user-submitted data to be received, referenced, identified, selected, and presented as a user-submitted response to a search query. For example, search query device 606 may be a collection of servers operated by a search engine operator, where the collection of servers receive, store, identify, and eventually present the information associated with user-submitted data.

A requester computing device is depicted by numeral 608. The requester computing device 608 is coupled to network 604. Generally, the requester computing device 608 is comparable to computing device 100. The requester computing device 608 allows a requester to provide a query to the search query device 606. In an exemplary embodiment, the requester utilizes an internet search engine user interface to enter an internet search query that is directed to the search query device 606 which is an internet search engine. The search query device 606 returns the user-submitted response in addition to the traditional search query results provided by an internet search engine.

In an exemplary embodiment, a user of the user-submitted computing device 602 communicates user-submitted data to the search query device 606 by way of the network 604. The search query device 606 receives the user-submitted data and prepares to utilize the user provided data as a user-submitted response to a search query. A requester then utilizes the requester computing device 608 to provide a search query. The search query is communicated to the search query device 606 by way of the network 604. Upon receiving the search query, search query device 606 identifies a user-submitted response from the user-submitted data based on the query-matching module information. The search query device 606 then presents the user-submitted response to the requester by way of the requester computing device 608.

Figure 7:
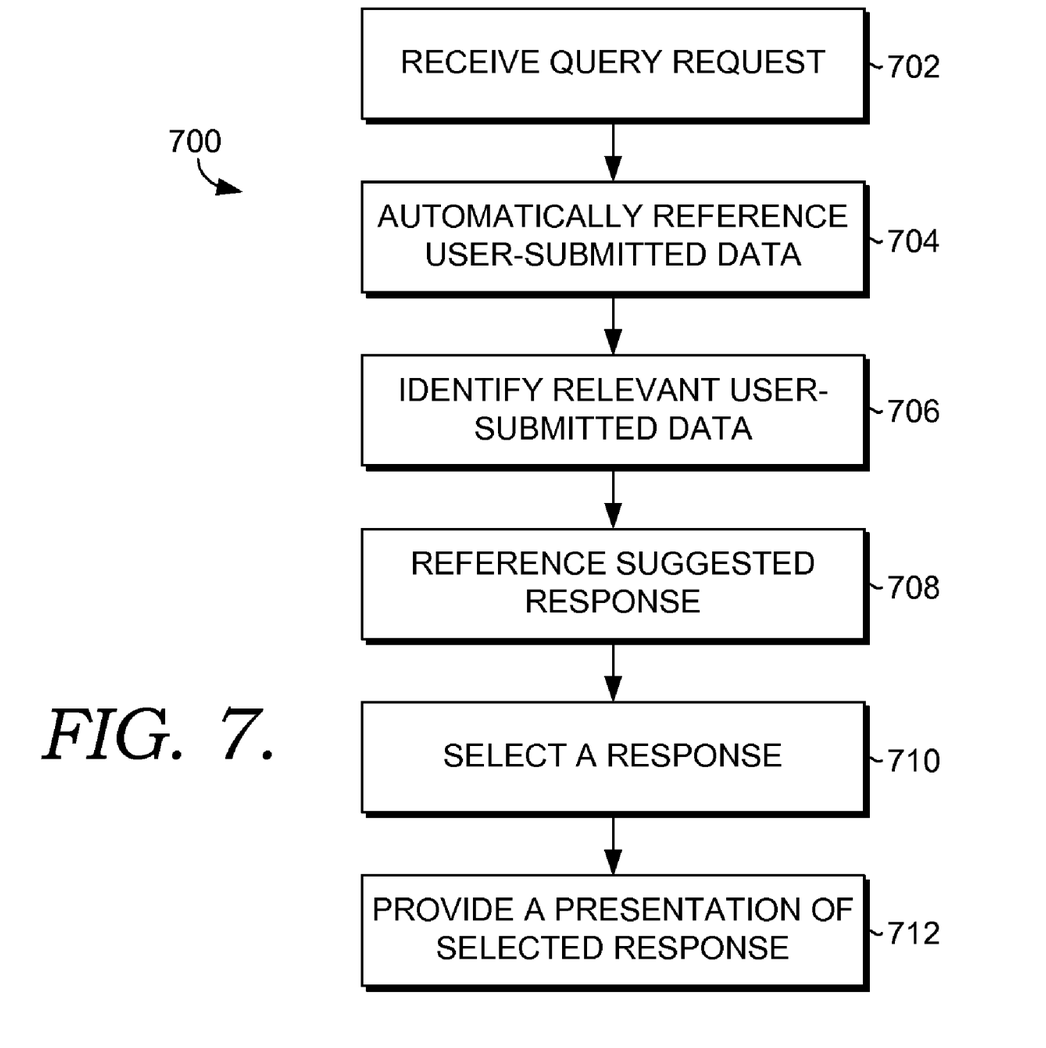
FIG. 7 depicts a first method for providing user-submitted response to a query request according to an embodiment of the present invention.

Turning now to FIG. 7, an illustrative method according to an embodiment for providing a user-submitted response to a query request is provided and referenced generally by the numeral 700. At a step 702 search query device 606 receives a query request from a requester utilizing requester computing device 608. The query request includes a set of query terms. A set of query terms includes a single word, a plurality of keywords, or a plurality of phrases. The set of query terms defines the search query. In an exemplary embodiment, a query request is received through a user interface for an internet search engine. In an alternative embodiment, the query request is received by way of a specific user interface that only references user-submitted data.

At step a 704, the search query computing device 606 automatically references user-submitted data. As previously discussed, user-submitted data includes information submitted by an entity to be presented as a response to a search query. The user-submitted data include trigger phrases that trigger a particular potential response included in the user-submitted data. As previously discussed, the included trigger phrases are provided with the intent of matching search queries with specific user-submitted responses. In an exemplary embodiment, the trigger phrases are included in the information of query-matching module 408. The trigger phrases are used by the search query device 606 to generate a pattern match. The pattern match is a pattern that is generated from the trigger phrases and when a search query matches the generated pattern, the response associated with the pattern match is identified. The user-submitted data is automatically referenced without the intervention of a human operator.

At a step 706, the search query computing device 606 identifies a user-submitted response of the user-submitted data. The user-submitted response is identified based on the associated trigger phrases that are used to trigger the user-submitted response in response to a search query. A user-submitted response is relevant to a search query when the trigger phrases of the user-submitted response matches the search query. The trigger phrases match the search query when there is a logical relationship that can be identified between the triggers and the search query. A logical relationship, in one embodiment, is provided when a pattern match based on the triggers corresponds to the search query. In an additional exemplary embodiment, a user-submitted response is relevant to a search query when the search query is contextually related to the user-submitted response. Further, a logical relationship exists when the requester of the search query would anticipate the presentation of the suggested response.

At a step 708, the search query computing device 606 references a set of suggested responses that correspond to the trigger phrases. The identified user-submitted data form the set of suggested responses. At a step 710, the search query computing device 606 selects one of the suggested responses from the set of potential responses referenced at step 708. In an exemplary embodiment, when the set of suggested responses includes multiple suggested responses that could be selected, the selection is determined by well-know techniques in query result ranking technologies. For example, the suggested response with a greatest relevance score is selected over the other suggested responses with a lesser relevance score. It is understood and appreciated by those with ordinary skill in the art the various techniques that may be utilized to select the suggested response with the greatest relevance to the search query.

At a step 712, search query computing device 606 provides for a presentation of the selected response selected at step 710. In an exemplary embodiment, the presentation of the selected response is the inclusion of the selected response in a listing of relevant traditional search query results. For example, screenshot 200 depicts the presentation of the user-submitted response 206 above the traditional search query results 214. Providing for a presentation of the selected response, in an exemplary embodiment, includes referencing the display-mapping module 406 to determine how to present the information of data module 402 that includes the selected response. Additionally, feed-mapping module 404 may be referenced to facilitate adoption of the information of data module 402 to the mapping of the display-mapping module 406.

In an exemplary embodiment, the requester that submitted the search query by way of the requester computing device 608 is not registered to receive a presentation of a user-submitted response. For example, requiring the requester to register in advance to receive a user-submitted response will prevent the user-submitted response from being presented to requesters that are not aware that the user-submitted response could be presented. For example, the requester may not have the initiative or resources to register to receive a user-submitted response, but the presentation of the user-submitted response would be beneficial to the requester. Therefore, in an exemplary embodiment, the requester does not register to receive the user-submitted response but is still presented with the user-submitted response in response to the search query.

Figure 8:
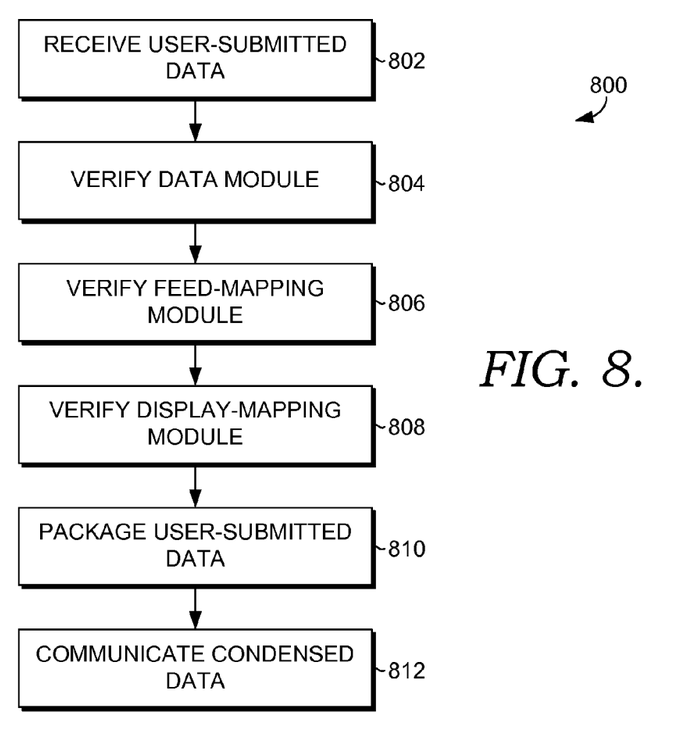
FIG. 8 depicts a second method for providing user-submitted response to a query request according to an embodiment of the present invention.

Turning now to FIG. 8, an illustrative method according to an embodiment for receiving a user-submitted potential response to an internet query request, is provided and referenced generally by the numeral 800. At a step 802, the search query computing device 606 receives user-submitted data. In an exemplary embodiment, the user-submitted data include the data module 402, the feed-mapping module 404, the display-mapping module 406, and the query-matching module 408.

At a step 804, the search query computing device 606 verifies the data module 402 conforms to a predefined valid format. Predefined valid formats are formats that are deemed appropriate to allow the information contained within the module to be utilized. For example, the structure of the information may be verified to ensure that the structure meets predefined criteria. The file format of the information may be verified to ensure that file information is provided in a format that can be interpreted. At a step 806, the feed-mapping module is verified. In addition to the verification process discussed with respect to step 804, additionally the verification process may include determining that the information of the feed-mapping module allows the information of the data module to be interpreted and utilized as intended. At a step 808, the search query computing device 606 verifies the display-mapping module. In addition to the verification discussed with respect to step 804, additional verification may include determining the information of the display-mapping module corresponds to an appropriate user interface to provide a presentation of the user-submitted response.

At a step 810, the user-submitted data is packaged as a condensed data file. In an exemplary embodiment, the modules of the user-submitted data are converted into a run-time file that is efficiently utilized by the search query computing device 606. For example, the information of the data module 402 is converted based on the information of the feed-mapping module 404 to result in user-submitted data that is interpretable by the search query computing device 606 without having to reference both modules to interpret the information of the data module 402.

At a step 812, the condensed user-submitted data is communicated to a search-query server. The search-query server triggers the user-submitted potential response of the condensed file to be presented in response to an internet search query. In an exemplary embodiment, search-query server is the search query computing device 606, but in an alternative embodiment, the search-query server is coupled to the search query computing device by way of network 604. The condensed user-submitted data allows for the user-submitted response to be presented to the requester in a more time-efficient and resource-efficient manner.

Figure 9:
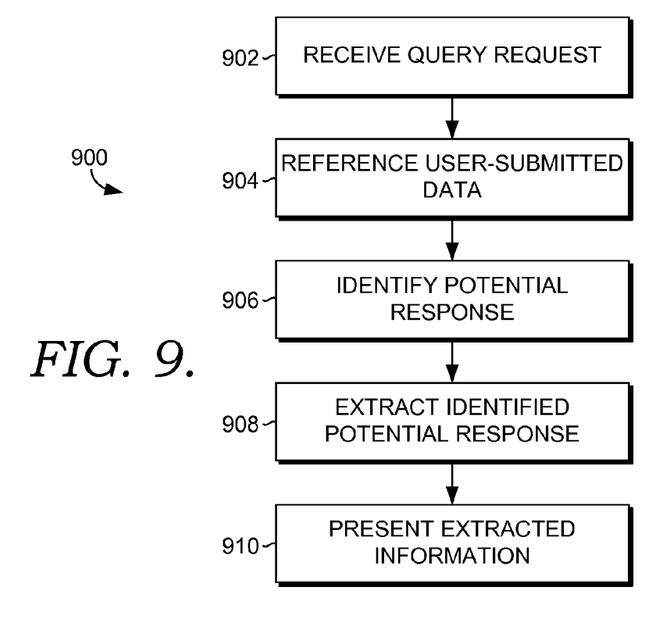
FIG. 9 depicts a third method for providing user-submitted response to a query request according to an embodiment of the present invention.

Turning now to FIG. 9, an illustrative method according to an embodiment for providing a response to a query request is provided and referenced generally by the numeral 900. At a step 902, the search query computing device 606 receives a query request from a requester utilizing the requester computing device 608. The requester is not registered to receive a user-submitted response in response to the query request. But, a user-submitted response, if available, will be presented to the requester even in the absence of registration. The query request includes one or more query terms that will be utilized to identify a potential user-submitted response to the query.

At a step 904, the search query computing device 606 references user-submitted data that includes one or more potential responses to the query. The user-submitted data has been verified to contain valid modules as discussed above. Modules of the user-submitted data include a data module 402, a feed-mapping module 404, a display-mapping module 406, and a query-matching module 408.

In this exemplary embodiment, the information of data module 402 is the information utilized for the potential response to the query. The information of data module 402 includes a subject, a term, and a term value. It is understood and appreciated by those with ordinary skill in the art that the information of data module 402 may contain multiple subjects, each with multiple terms and associated term values. The information of the data module 402 is translated using the adapter capabilities of the feed-mapping module 404. As previously discussed, the feed-mapping module 404 allows for the interpretation of the information contained in the data module 402 regardless of the structure of the information. The display-mapping module 406 provides a preferred presentation style for the potential response retrieved from the information of the data module 402. The query-matching module 408 of the user-submitted data includes one or more trigger phrases that are utilized to initiate one or more of the potential responses included in the information of data module 402. In an exemplary embodiment, the trigger phrases are utilized to create a pattern, where the pattern provides a way to identify when a query should initiate a particular user-submitted response.

At a step 906, the search query computing device 606 identifies one or more potential responses based on a pattern match between the query terms and the query-matching module. As previously discussed, the trigger phrases included in the information of the query matching module are used to identify which of the user-submitted potential responses should be identified as relevant to the current query. At a step 908, once a user-submitted response has been identified, the user-submitted response is extracted from the data module 402 utilizing the adapter capabilities of the feed-mapping module 404. At a step 910, the search query computing device 606 presents the user-submitted response to the requester. In an exemplary embodiment, the search query computing device 606 presents the extracted information to the requester computing device 608 according to the information included in the display-mapping module 406.

Figure 10:
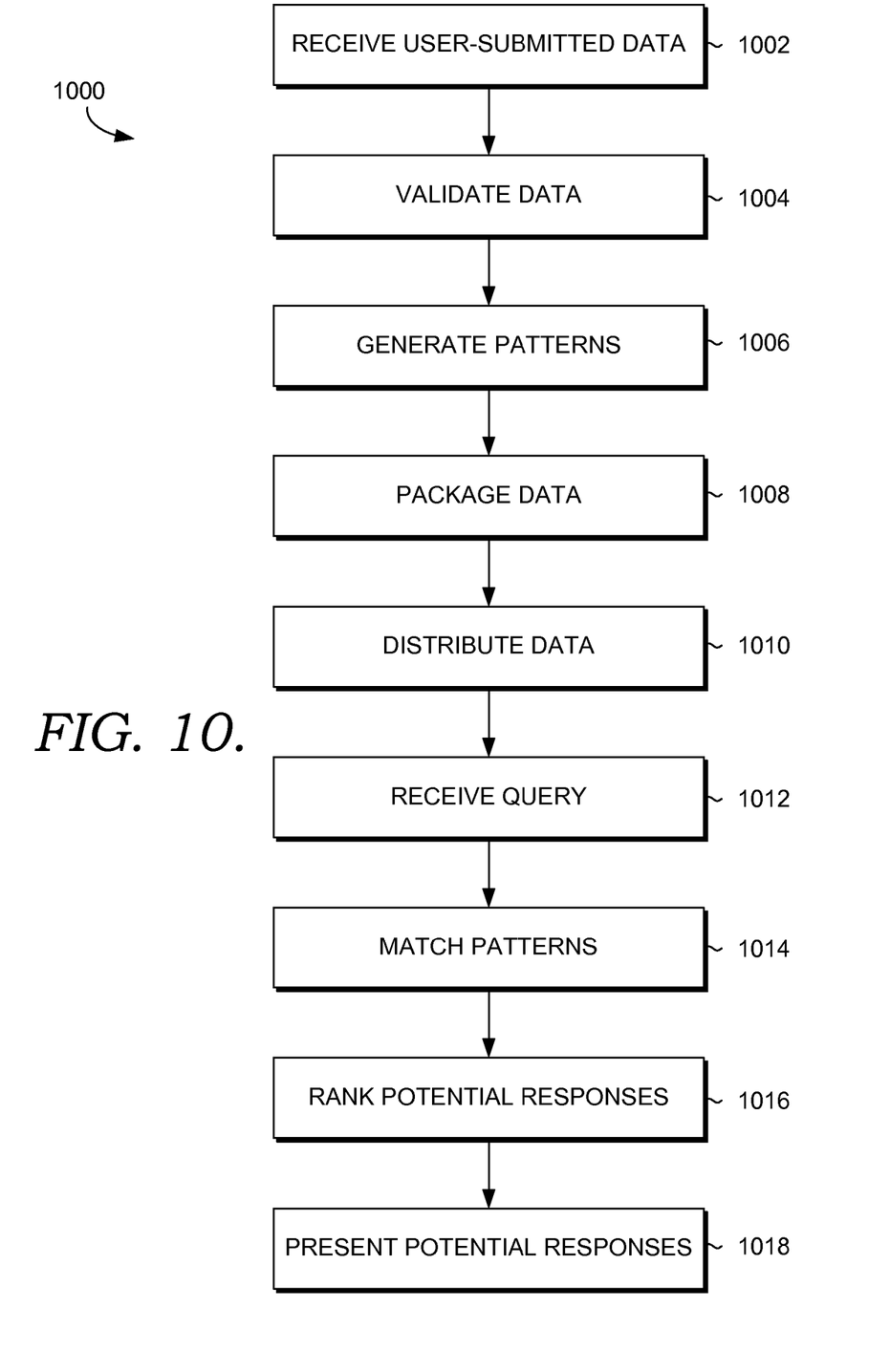
FIG. 10 depicts a fourth method for providing user-submitted response to a query request according to an embodiment of the present invention.

Turning now to FIG. 10, an illustrative method according to an embodiment for receiving user-submitted data for providing a response to a query request is provided and referenced generally by the numeral 1000. At a step 1002, the search query computing device 606 receives user-submitted data. The data are then validated. At a step 1004, validation includes checking to determine that the data or format conforms to predefined criteria. At a step 1006, the search query computing device 606 generates patterns based on the information of the user-submitted data. This generation helps facilitate identification of the potential user-submitted responses. The patterns help enable a certain user-submitted response to be identified as being related to the query. At a step 1008, the user-submitted data and the generated patterns are packaged as a condensed data file or files. At a step 1010, the condensed data file is then distributed by the search query computing device 606 to one or more other search query computing devices 606. As previously discussed, search query computing device 606, in an exemplary embodiment, includes multiple computing devices that are distributed, but yet coupled to perform the function of providing a response to a query. For example, search query computing device 606 may include multiple servers in multiple locations all working together to achieve the same result.

At a step 1012, after the user-submitted data is distributed, the search query computing device 606 receives a query. The search query contains multiple words that are utilized to identify a relevant user-submitted response. At a step 1014, the pattern generated at step 1006 is referenced to identify the user-submitted response that is relevant to the terms of the search query received at step 1012. At a step 1016, when multiple user-submitted responses are identified as relevant to the terms of the query, the potential responses are ranked according to their relevance in order to provide the most relevant user-submitted response. At a step 1018, the ranked potential user-submitted responses are presented to the requester. In an exemplary embodiment, multiple user-submitted responses are presented to the requester. In an alternative exemplary embodiment, only the most relevant user-provided response is presented to the requester.

What is claimed is:

1. One or more computer-storage media having computer-executable instructions embodied thereon for performing a method of providing a response to a query request, the method comprising:
   receiving the query request by way of an internet search engine, the query request including a set of query terms;
   automatically referencing a set of user-submitted data that include information to be used to provide a potential response to a given query, the user-submitted data being provided by entities interested in providing potential responses to certain search terms, wherein the data files include trigger phrases and corresponding suggested responses that correspond to the trigger phrases, the user-submitted data are in a file format compatible with a format of a type selected from:
   Extensible Markup Language (XML),
   Comma Separated Values (CSV), and
   Tab Delimited;
   identifying one or more of the user-submitted data that include prescribed trigger phrases that are relevant to the query terms;
   referencing a set of suggested responses that correspond to the prescribed trigger phrases;
   based on the set of suggested responses, selecting a response from the set of suggested responses, thereby providing a selected response; and
   providing for a presentation of the selected response.

2. The media of claim 1, wherein the user-submitted data are comprised of the following modules:
   a data module that includes information to be used to provide a potential response to a given search query,
   a feed-mapping module that provides a translation for the information of the data module to be interpreted regardless of the formatting of the information, a display-mapping module that provides a presentation style for the potential response, and a query-matching module that includes the trigger phrases associated with the potential response.

3. The media of claim 2, wherein the information to be used for the potential response includes a subject, a term, and a term value, such that the feed-mapping module allows for an interpretation of the subject, the term, and the term value regardless of terminology utilized in the user provided data.

4. The media of claim 2, wherein providing for the presentation includes referencing the display mapping module that indicates how the selected response is to be displayed.

5. The media of claim 1, wherein the potential response to the given query is a response to an internet search query, such that the response is available to be presented as an answer to the internet search query without providing a hyperlink to a source of the answer.

6. The media of claim 1, wherein the trigger phrase includes one or more keywords that are contextually related to one or more of the suggested responses, such that a searcher that submits a search query would anticipate the one or more suggested responses to be presented as a result of the search query.

7. The media of claim 1, wherein the user provided data are relevant to the query terms when the query terms match a pattern of the prescribed trigger phrases.

8. The media of claim 1, wherein selecting a response includes ranking one or more of the suggested responses from the set of suggested responses, such that only one response is presented for the query request.

9. The media of claim 1, wherein the set of user-submitted data include a second set of user-submitted data that updates the set of user provided data to include data information of the second set of user-submitted data.

10. A method for receiving a user-submitted potential response to an internet query request, the method comprising:
receiving user-submitted data that include one or more of the user-submitted potential responses, wherein the user-submitted data include the following modules,
(1) a data module that includes information to be used to provide a potential response to a given search query, wherein the potential response includes a subject, a term, and a term value,
(2) a feed-mapping module that provides a translation for the information of the data module to be interpreted regardless of the formatting of the information,
(3) a display-mapping module that provides a preferred presentation style for the potential response, and
(4) a query-matching module that includes at least one trigger phrase associated with the potential response, such that the trigger phrase initiates the potential response;
verifying the data module conforms to a predefined valid format, wherein verifying the data modules conforms to a predefined valid format includes inspecting that the data modules are in a format of a type selected from:
Extensible Markup Language (XML),
Comma Separated Values (CSV), and
Tab Delimited;
verifying the feed-mapping module conforms to a predefined valid format;
verifying the display-mapping module conforms to a predefined valid format;
packaging the user-submitted data as a condensed data file; and
communicating the condensed data file to a search-query server, such that the internet query received by the query server triggers the user-submitted potential response to be presented in response to the internet search query.

11. The method of claim 10, wherein the user-submitted response is submitted by a user registered to submit the user-submitted response.

12. The method of claim 10, wherein the preferred presentation styles include a plurality of styles, such that each member of the plurality of styles is associated with a predefined user interface.

13. The method of claim 10, wherein the trigger phrases are one or more keywords that are logically related to the associated potential response, such that a pattern of the one or more keywords is matched to the internet search query to cause the initiation of the potential response.

14. The method of claim 10, wherein the condensed data file is compatible with a run-time file format interpretable by the query server.

15. The method of claim 10 further comprising:
receiving an updated data modules;
verifying the updated data module conforms to a predefined valid format;
packaging the updated data modules, the feed-mapping modules, the display-mapping module, and the query-matching module as a condensed data file; and
communicating the condensed data file to a search query server.

16. One or more computer-storage media having computer-executable instructions embodied thereon for performing a method of providing a response to a query request, the method comprising:
receiving the query request that includes query terms from a requester, wherein the requester is not registered to receive the response;
referencing data submitted by a user authorized to submit the data, which data include potential responses to the query request, such that the data include the following modules that have been validated as valid modules that are in a file format compatible with a format of a type selected from Extensible Markup Language (XML), Comma Separated Values (CSV), and Tab Delimited,
(1) a data module that includes information to be used to provide a potential response to a given search query, wherein the potential response includes a subject, a term and a term value,
(2) a feed-mapping module that provides a translation for the information of the data module to be interpreted regardless of the formatting of the information,
(3) a display-mapping module that provides a preferred presentation style for the potential response, and
(4) a query-matching module that includes at least one trigger phrase associated with the potential response, such that the trigger phrase initiates the potential response;
identifying the potential response based on a pattern match between the query terms and the query-matching module, wherein the information of the identified potential response is extracted utilizing the feed-mapping module; and
presenting the extracted information to the requester such that the extracted information is presented according to the display-mapping module.

17. The media of claim 16, wherein the display-mapping module includes information specific to the user interface where the extracted information is presented.

18. The method of claim 16, wherein the trigger phrases are utilized to develop the pattern match with the query terms.

* * * * *